United States Patent Office 3,161,679
Patented Dec. 15, 1964

3,161,679
PROCESS FOR THE PREPARATION OF
N-ALKYLACRYLAMIDES
Michael Joseph D'Errico, Stamford, Conn., and Winfried Josef Fremuth, Frankfurt, Germany, assignors to American Cyanamid Company, Stamford, Conn., a corporation of Maine
No Drawing. Filed May 23, 1963, Ser. No. 282,599
6 Claims. (Cl. 260—561)

This invention relates to the process for preparing N-alkylacrylamides and more particularly to the process for the preparation of such acrylamides by reacting long chain olefins with suitable α-unsaturated nitriles in the presence of a strong cationoid substance such as sulfuric acid. Such a reaction may generally be described as a Ritter reaction and products resulting therefrom as Ritter reaction products.

Of comparatively recent times, long chain olefins have become available from the petroleum industry in substantial quantity and at reasonable cost. In addition, suitable nitriles as, for example, acrylonitrile and certain of its analogues, have become available in substantial quantities.

Accordingly, it is an object of the present invention to provide a process for preparing N-alkylacrylamides and in particular secondary N-alkylacrylamides in good yield employing the so-called Ritter reaction.

It is a further object of the present invention to provide a multi-step process which involves the use of a number of mutually dependent process variables whereby N-alkylacrylamides may be rapidly and easily produced in high yields and with a relatively minor content of impurities.

These and other objects and advantages of the present invention will become apparent from the detailed description thereof set forth hereinbelow.

In accordance with this invention, a process is provided for preparing N-alkylacrylamides, which comprises reacting on a relative mole basis about one mole of a suitable nitrile and one mole of an olefin having at least 10 carbon atoms and up to 40 carbon atoms in the presence of an excess, more than one mole, of a cationoid substance capable of completely protonizing the double bond of the olefin. The cationoid substance, normally and preferably strong sulfuric acid, is employed in accordance with our invention in an amount of from between about 30 to about 250% in excess of the theoretical one mole that is required to react one mole of olefin with one mole of nitrile as in accordance with the reaction set forth below. The over-all process is carried out at a temperature of less than 90° C. The N-alkylacrylamide reaction product is thereafter hydrolyzed and neutralized.

The reaction will normally be carried out at atmospheric pressure although subatmospheric or superatmospheric pressure may be employed.

The reaction to which the present process is directed may be best illustrated as follows:

(1)
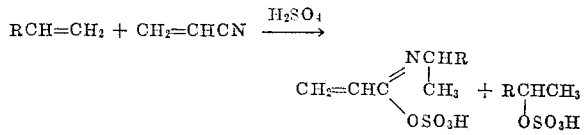

(2)
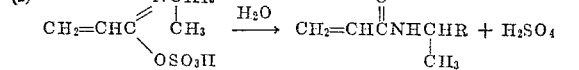

The olefins suitable for use in the present process are long chain materials which preferably may be further characterized as being predominantly straight chain, i.e. having a minimum of about 75% of straight chain materials. As indicated hereinabove, such materials are available from the petroleum industry sometimes as mixtures of olefins or olefin fractions. Normally such compounds will contain from 10 to about 20 carbon atoms. As examples of suitable olefins, the following are illustrative: decene-1, decene-2, decene-3, decene-4, decene-5, undecene-1, undecene-2, undecene-3, undecene-4, undecene-5, dodecene-1, dodecene-2, dodecene-3, dodecene-4, dodecene-5, dodecene-6, tridecene-1, tridecene-2, tridecene-3, tridecene-4, tridecene-5, tridecene-6, tetradecene-1, tetradecene-2, tetradecene-3, tetradecene-4, tetradecene-5, tetradecene-6, tetradecene-7, pentadecene-1, pentadecene-2, pentadecene-3, pentadecene-4, pentadecene-5, pentadecene-5, pentadecene-6, pentadecene-7, hexadecene-1, hexadecene-2, hexadecene-3, hexadecene-4, hexadecene-5, hexadecene-6, hexadecene-7, hexadecene-8, octadecene-1, octadecene-2, octadecene-3, octadecene-4, octadecene-5, octadecene-6, octadecene-7, octadecene-8, octadecene-9, telomers of isobutylene such as triisobutylene, tetraisobutylene, telomers of isopropylene such as propylene tetramer, propylene hexamer, and the like. In addition, of course, mixtures of two or more of such olefins are contemplated, including such fractions as are identified hereinafter.

The nitriles employable in the present process are α-unsaturated nitriles such as acrylonitrile, α-substituted acrylonitriles such as methacrylonitrile, α-chloroacrylonitrile and β-substituted acrylonitriles, such as crotonitrile, β-chloroacrylonitrile and other equivalent materials.

In carrying out the process of this invention, we have determined that good product yield is dependent upon a number of integrally dependent steps. Thus we have determined that the suitable nitrile and the olefin should be first mixed prior to the addition thereto of the cationoid substance such as strong sulfuric acid. In the event that this procedure is reversed, namely that the mixture of the nitrile and the olefin is added to the acid or the acid is added to the olefin and then the nitrile subsequently added thereto, the yields are dramatically lower.

As will be apparent, the term N-alkylacrylamide as it is employed herein is intended to include the Ritter reaction product, which results from the reaction of suitable α-unsaturated nitriles and suitable olefins, as those terms are described herein, in the presence of a cationoid substance such as sulfuric acid.

By good product yield as that term is employed herein it is meant yields of at least 60%, based on theory, assuming pure olefins.

In addition, we have determined that in order to maintain uniformly good yields of N-alkylacrylamides in accordance with the process aspects of this invention the addition of the cationoid material to the olefin and nitrile must be effected at a temperature of less than 25° C. and normally at a temperature of from between 0 and 20° C.

As noted supra, the nitrile and the olefin are normally employed in relative mole ratios of about 1:1. No operational or economic advantages have been noted by employing either in excess and in fact the employment of either in excess normally results in recovery problem and other disadvantages. The cationoid substance, preferably strong sulfuric acid, must be employed in a substantial excess, as noted above, said excess being from between 30 and about 250% of the theoretical one mole required to react with one mole of olefin and one mole of nitrile. Best results are usually obtained when the excess is from between 100 and about 200%.

An additional important variable critical to the present process is that after completion of the addition of the cationoid substance the temperature of the reaction mixture should be maintained at from about 40° C. to less than 90° C.

It has been observed, as will be demonstrated hereinafter, that the employment of the temperature within the indicated critical range in the absence of a suitable excess of acid produces surprisingly low yields of N-alkylacrylamide and conversely that excess of acid within the critical limits while employing temperature ranges significantly lower produces surprisingly low yields of the desired N-alkylacrylamides.

Thus, while each of the variables above referred to is indeed dependent in the sense that good product yield cannot be obtained if they are not properly employed, the dependency between excess acid and reaction temperature after complete addition of the acid appears to be particularly critical in the present process, not only with regard to the quantitative yield of N-alkylacrylamides but also with respect to the amount of impurity contained therein, such as alkane sulfates when sulfuric acid is employed as a cationoid substance.

With regard to the cationoid substance, as indicated above, any acid employed in an amount large enough to produce an acidity capable of completely protonizing the double bond of the olefin could be employed. Practically in the present process, it has been found that strong sulfuric acid is greatly preferred. By "strong sulfuric acid" it is meant acid characterized by being at least 90% $H_2SO_4$ and usually from between 95 and 100%.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

*Example 1*

N-(dodecyl)acrylamide was prepared employing the procedure set forth below:

(A) To a mixture of 0.5 mole dodecene-1 and 0.5 mole acrylonitrile, stirred in a 500 cc. Morton-type flask, were added 0.5 mole conc. sulfuric acid (97.5%) at a temperature of 0–10° C.

(B) After all the acid had been added, the reaction mixture was allowed to warm up until it became homogeneous.

(C) The solution was then cooled to 0–10° C. and another 0.5 mole sulfuric acid was added at this temperature.

(D) After this second addition the temperature of the solution was again allowed to rise to 50° C., and was maintained there initially with cooling, finally with heating for 3 hours.

(E) The solution was then poured over a stirred mixture of 200 cc. ice and 500 cc. water and the resulting slurry stirred at room temperature for 30 minutes.

(F) Then 400 cc. of a 20% NaOH solution were added to the mixture at 10–20° C.

(G) Finally the mixture was again chilled to about 0° C., the product filtered off and washed with 250 cc. cold water. The resulting solid was dried thoroughly. Yield: 91 g. (76.1%) N-(dodecyl)acrylamide.

*Example 2*

The procedures and materials employed in Example 1 were employed here with the exception that the reaction period in Step D was extended to 5 hours. Thus at 50° C. the total reaction mixture was reacted for 5 instead of 3 hours. Yield: 91.0 g. (76.1%) N-(dodecyl)acrylamide.

*Example 3*

The same materials and procedures as were employed in Example 1 were employed herein except that the reaction period in Step D was reduced from 3 hours to 1 hour. Yield: 89.7 g. (75%) N-dodecyl)acrylamide.

Examples 2 and 3 hereinabove demonstrate that the yield obtained is not substantially varied by varying the time of reaction for the total reaction mixture for from 5 to 1 hours.

*Example 4*

The same procedure as was employed in Example 1 was here employed except that the mole ratio of the reactants was 1:1:1.3 olefin, acrylonitrile and sulfuric acid, respectively, and thus only 0.15 mole of sulfuric acid was added in that step corresponding to Step C in Example 1 above. In this process there was a 30% excess of sulfuric acid employed. Yield: 70 g. (58.3%) N-(dodecyl)acrylamide.

*Example 5*

The same procedure as was employed in Example 1 was here employed except that the mole ratio of the reactants was 1:1:1.5 olefin, acrylonitrile and sulfuric acid, respectively, and thus only 0.25 mole of sulfuric acid was added in that step corresponding to Step C in Example 1 above. In this process there was a 50% excess of sulfuric acid employed. Yield: 72 g. (60.2%) N-(dodecyl)acrylamide.

*Example 6*

The process as employed in Example 1 was employed herein except that the mole ratio of the reactants was 1:1:3 olefin, acrylonitrile and sulfuric acid, respectively. Thus in the corresponding Step C 1 mole of sulfuric acid was added. The total sulfuric acid was a 200% excess. Yield: 100 g. (83.7%) N-(dodecyl)acrylamide.

Examples 4, 5, and 6 hereinabove demonstrate that the addition of substantial excesses of sulfuric acid in accordance with the other process conditions defined does in fact significantly improve the product yield.

*Example 7*

The same reactants and procedure as were employed in Example 1 were employed here except that all of the sulfuric acid was added at once, but very slowly, thus omitting that step corresponding to Step B in Example 1. Yield: 90.0 g. (75.2%) N-(dodecyl)acrylamide.

*Example 8*

The same procedure and reactants as were employed in Example 1 were employed here except that 0.5 mole of octadecene-1 was employed instead of 0.5 mole of dodecene-1 and the temperatures of Steps A and C in Example 1 were changed to from 10 to 20° C. for Step A and 20 to 25° C. Yield: 150.2 g. crude (93%), 108 g. reslurried (67%) N-(octadecyl)acrylamide.

*Example 9*

The same procedure and reactants as were employed in Example 1 were employed here through Steps A–F with the exception that a mixture of $C_{10}$–$C_{15}$ α-unsaturated olefins were used which have an average molecular weight of 180. After neutralization the mixture was extracted with ether and the ether layer dried over magnesium sulfate and finally stripped off under vacuum. Yield: 76.5 g. (61%) N-($C_{10}$–$C_{15}$ alkyl)acrylamide.

*Example 10*

The same procedure as was set forth in Example 1 was employed herein except that all the acid was added initially to the mixture of olefin and acrylonitrile and the mole ratio between olefin, acrylonitrile and sulfuric acid was 1:1:1. This procedure therefore omitted Steps B and C of Example 1. The remaining steps were the same except that in Step F 400 grams of a 10% sodium hydroxide solution was used. Yield: 44 g. (36.8%) N-(dodecyl)acrylamide.

*Example 11*

The same procedure as was employed in Example 9 was employed herein except that the reaction period in Step D was extended to 17 hours. Yield: 53 g. (44.3%) N-(dodecyl)acrylamide.

*Example 12*

The same procedure as was employed in Example 7 was employed here except that the reaction period and temperature in Step D were 1 hour and 0 to 10° C., respectively. Yield: 85 g. of an approximate 50:50 mixture of N-(dodecyl)acrylamide and sodium dodecane-2-sulfate.

*Example 13*

The procedures and materials were the same as in Example 1, except that 0.5 mole methacrylonitrile were substituted for the 0.5 mole acrylonitrile. Yield: 98.0 g. (77.5%) N-(dodecyl)methacrylamide.

Examples 10 and 11 hereinabove demonstrate that an excess of strong sulfuric acid is essential to the present process if satisfactory yields are to be obtained. Compare Examples 9 and 10 with Examples 4 and 6 respectively. This comparison will show that by employing a 30% excess of sulfuric acid under the other conditions of the present claimed process that almost 50% improvement in yield is obtained and that when the excess is of the order of 200% (Example 6) the improvement of yield is more on the order of 100% relative to those yields obtained in processes which do not employ an excess of the acid.

Example 12 demonstrates that if the excess of acid and temperatures within applicants' range are not employed simultaneously, poor quality products containing substantial amounts of generally undesirable sulfates, as for example, sodium dodecane-2-sulfate, renders it extremely difficult to isolate the desired end product and to form suitable polymers therefrom as well as other compounds, and as a general rule should be minimized. As noted hereinabove, the present process as a practical matter results in substantially less of these reaction by-products employing the process of this invention.

While the above invention has been described as being a batch type process, it will be readily appreciated that it is adaptable to continuous or semi-continuous operation.

The N-alkylacrylamides prepared in accordance with the present invention may be sulfonated by being reacted with alkali bisulfites to form products found to produce excellent wetting agents and detergents. The conversion of such acrylamides to their sulfonated derivatives and their use as detergents and wetting agents are described in the copending applications of John K. Magrane, Serial No. 111,461, filed May 22, 1961, now abandoned; Edward H. Sheers and David R. Sexsmith, Serial No. 111,462, filed May 22, 1961, now abandoned; Emil A. Vitalis, Michael J. D'Errico and Winfried J. Fremuth, Serial No. 111,463, filed May 22, 1961, now abandoned; Wesley O. Fugate and Michael J. D'Errico, Serial No. 111,464, filed May 22, 1961, now abandoned; and in the copending applications of Edward Helmut Sheers and David Randal Sexsmith, Serial No. 282,598, filed May 23, 1963; Emil Alfred Vitalis, Michael Joseph D'Errico and Winfried Josef Fremuth, Serial No. 274,342, filed April 19, 1963; and Wesley Orlean Fugate and Michael Joseph D'Errico, Serial No. 282,553, filed May 23, 1963.

This application is a continuation-in-part of our copending application Serial No. 111,465, filed May 22, 1961, and now abandoned.

While this invention has been described in conjunction with various preferred embodiments, it is to be understood that the invention is not to be solely limited thereto but is to be construed broadly and restricted only by the appended claims.

We claim:

1. In a process for preparing N-alkylacrylamides by reacting an α-unsaturated nitrile and an olefin having at least 10 carbon atoms in the presence of strong sulfuric acid, the improvement which comprises employing said acid in an amount from about 30 to 250% in excess of the theoretical one mole required to react relative amounts of one mole of said olefin with one mole of said nitrile, and carrying out the reaction between said olefin and said nitrile in the presence of said sulfuric acid at a temperature of from about 40° C. to less than about 90° C.

2. In a process for preparing N-alkylacrylamides by reacting an α-unsaturated nitrile and a predominantly straight chain olefin having from 10 to about 20 carbon atoms in the presence of a strong sulfuric acid, the improvement which comprises employing said acid in an amount from about 30 to 250% in excess of the theoretical one mole required to react relative amounts of one mole of said olefin with one mole of said nitrile, carrying out said reaction at a temperature of from about 40° C. to about 90° C. and thereafter hydrolyzing and neutralizing the reaction product.

3. A process according to claim 1 in which the nitrile is acrylonitrile.

4. In a process for preparing N-alkylacrylamides by adding to a mixture of an α-unsaturated nitrile and a predominantly straight chain olefin having from 10 to 20 carbon atoms, strong sulfuric acid, the improvement which comprises maintaining the temperature of the reaction mixture at less than room temperature during acid addition, and maintaining the temperature of reaction at from between 40 and 90° C. after acid addition, employing said acid in an amount of from about 30 to about 250% in excess of the theoretical one mole required to react relative amounts of one mole of said olefin with one mole of said nitrile, and thereafter hydrolyzing and neutralizing the reaction product.

5. A process according to claim 4 in which the nitrile is acrylonitrile.

6. A process according to claim 4 in which the sulfuric acid is added to the mixture of olefin and acrylonitrile while maintaining the temperature at from 0 to 20° C.

No references cited.